United States Patent
Jeuk et al.

(10) Patent No.: US 10,455,038 B2
(45) Date of Patent: Oct. 22, 2019

(54) INDIRECT INTEGRATION OF NETWORK CONNECTED DEVICES INTO SERVICE FUNCTION CHAINS

(71) Applicant: Cisco Technology, Inc., San Jose, CA (US)

(72) Inventors: Sebastian Jeuk, San Jose, CA (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 15/447,346

(22) Filed: Mar. 2, 2017

(65) Prior Publication Data

US 2018/0255152 A1    Sep. 6, 2018

(51) Int. Cl.
*G06F 13/00* (2006.01)
*H04L 29/08* (2006.01)
*H04L 12/725* (2013.01)

(52) U.S. Cl.
CPC .............. *H04L 67/28* (2013.01); *H04L 67/12* (2013.01); *H04L 67/327* (2013.01); *H04L 45/306* (2013.01)

(58) Field of Classification Search
CPC ........... H04J 3/16; H04J 3/1617; H04L 12/28; H04L 29/06; H04L 29/06068; H04L 29/06095; H04L 29/08072; H04L 41/12; H04L 41/22; H04L 41/0213; H04L 45/306; H04L 67/12; H04L 67/28; H04L 67/327; H04Q 7/20; H04Q 11/0478; H04W 4/00
USPC .......................................... 370/466; 709/223
See application file for complete search history.

(56) References Cited

U.S. PATENT DOCUMENTS

| 2006/0133414 A1* | 6/2006 | Luoma | H04W 88/16 370/466 |
|---|---|---|---|
| 2016/0150357 A1 | 5/2016 | Jung et al. | |
| 2016/0157043 A1 | 6/2016 | Li et al. | |
| 2016/0261474 A1 | 9/2016 | Raghavan et al. | |

FOREIGN PATENT DOCUMENTS

WO    2016/055097 A1    4/2016

OTHER PUBLICATIONS

C. Alcaraz, et al., "Wireless Sensor Networks and the Internet of Things: Do We Need a Complete Integration?", 1st International Workshop on the Security of the Internet of Things (SecIoY10), Dec. 2010, Tokyo, Japan, 8 pages.

(Continued)

*Primary Examiner* — Robert B Harrell
(74) *Attorney, Agent, or Firm* — Edell, Shapiro & Finnan, LLC

(57) ABSTRACT

A gateway device is configured to operate as a network function in a service function chain and is connected to a plurality of network connected devices. The gateway device receives a service function chain packet that includes a request to obtain data from one or more of the plurality of network connected devices. The gateway device obtains the data from the one or more network connected devices and modifies the service function chain packet to include the data obtained from the one or more network connected devices. The gateway device sends the service function chain packet that has been modified to include that data obtained from the one or more network connected devices along the service function chain.

20 Claims, 7 Drawing Sheets

(56) References Cited

OTHER PUBLICATIONS

C. Jennings et al., "Media Types for Sensor Markup Language (SenML) draft-ieff-core-senml-03", Network Working Group, Internet-Draft, Intended status: Standards Track, Oct. 7, 2016, 36 pages.
ETSI, "Mobile Edge Computing (MEC); Framework and Reference Architecture", ETSI GS MEC 003 V1.1.1, Reference DGS/MEC-003Arch, Mar. 2016, 19 pages.
Fibaro System, "Home Center Lite", Mar. 5, 2014, 16 pages.
Cisco Systems, Inc., "Fog Computing and the Internet of Things: Extend the Cloud to Where the Things Are", C11-734435-00, Apr. 2015, 6 pages.

\* cited by examiner

| 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|
| VER | O | C | R | R | R | R | R | R | R | LENGTH | | | | | | MD-TYPE-0x1 | | | | | NEXT PROTOCOL | | | | | | | |
| SERVICE PATH IDENTIFIER | | | | | | | | | | | | | | | | | | | | | | | | | | | SERVICE INDEX | | | |
| [{"n":"urn:dev:ow:10e2073a01080063","u":"Cel","v":23.1}] | | | | | | | | | | | | | | | | | | | | | |
| [{"n":"urn:dev:ow:10e2073a01080063","u":"Cel","v":23.1}] | | | | | | | | | | | | | | | | | | | | | |
| [{"n":"urn:dev:ow:10e2073a01080063","u":"Cel","v":23.1}] | | | | | | | | | | | | | | | | | | | | | |
| [{"n":"urn:dev:ow:10e2073a01080063","u":"Cel","v":23.1}] | | | | | | | | | | | | | | | | | | | | | |

551 RECEIVING A SERVICE FUNCTION CHAIN PACKET THAT INCLUDES A REQUEST TO OBTAIN DATA FROM ONE OR MORE OF THE PLURALITY OF SPECIAL PURPOSE NETWORK CONNECTED DEVICES, WHEREIN THE GATEWAY DEVICE IS CONFIGURED TO OPERATE AS A PROXY DEVICE TO INDIRECTLY INTEGRATE THE ONE OR MORE SPECIAL PURPOSE NETWORK CONNECTED DEVICES INTO THE SERVICE FUNCTION CHAIN

553 OBTAINING THE DATA FROM THE ONE OR MORE SPECIAL PURPOSE NETWORK CONNECTED DEVICES

555 MODIFYING THE SERVICE FUNCTION CHAIN PACKET TO INCLUDE THE DATA OBTAINED FROM THE ONE OR MORE SPECIAL PURPOSE NETWORK CONNECTED DEVICES

557 SENDING THE SERVICE FUNCTION CHAIN PACKET THAT HAS BEEN MODIFIED TO INCLUDE THE DATA OBTAINED FROM THE ONE OR MORE SPECIAL PURPOSE NETWORK CONNECTED DEVICES ALONG THE SERVICE FUNCTION CHAIN

FIG.5

INDIRECT INTEGRATION OF NETWORK CONNECTED DEVICES INTO SERVICE FUNCTION CHAINS

TECHNICAL FIELD

The present disclosure relates to network connected devices.

BACKGROUND

The Internet of Things (IoT) is a general term used to describe the addition of networking capabilities to physical objects or "things" that serve some purpose or function outside of computing and/or networking technologies (i.e., traditionally "unconnected" or "offline" devices), such as thermometers, refrigerators, lights, wristbands, and sensors. In general, these "things," sometimes referred to as IoT enabled-devices, IoT devices, or special purpose network connected devices, are embedded with electronics, software, and network interfaces, which enables the physical objects to send and/or receive data packets over a network.

The rapid rise of IoT has resulted in steadily increasing numbers and types of special purpose network connected devices. In certain arrangements, IoT gateways facilitate communication between one or more IoT devices and a network.

BRIEF DESCRIPTION OF THE DRAWINGS

FIG. 4A is a diagram illustrating a service header that may be used for indirect integration of a special-purpose network device into a service function chain, according to an example embodiment.

FIG. 5 is a flowchart of a method, according to an example embodiment.

DESCRIPTION OF EXAMPLE EMBODIMENTS

Overview

Presented herein are techniques for indirectly integrating network connected devices into service function chains. In one example, a gateway device is configured to operate as a network function in a service function chain and is connected to a plurality of network connected devices. The gateway device receives a service function chain packet that includes a request to obtain data from one or more of the plurality of network connected devices. The gateway device obtains the data from the one or more network connected devices and modifies the service function chain packet to include the data obtained from the one or more network connected devices. The gateway device then sends the service function chain packet, which has been modified to include that data obtained from the one or more network connected devices, along the service function chain.

Example Embodiments

A "service function chain" is a data structure defining a set of service functions (services) and the order in which the service functions should be applied. For proper operation, service function chains typically rely on fully functional network nodes/devices that provide a full network stack. However, sensors or other Internet of Things (IoT) devices, sometimes referred to herein as special purpose network connected devices, typically only provide minimal functionality, making it difficult to use IoT devices in service function chains. For example, IoT devices typically lack the processing capabilities needed to handle the service headers that are used for forwarding data/packets in service function chains. The use of IoT devices in service function chains is also becoming less and less practical as the number of IoT devices continues to increase. However, there still may be the need to incorporate the functionality provided by certain IoT devices into service function chains.

Figure 1:
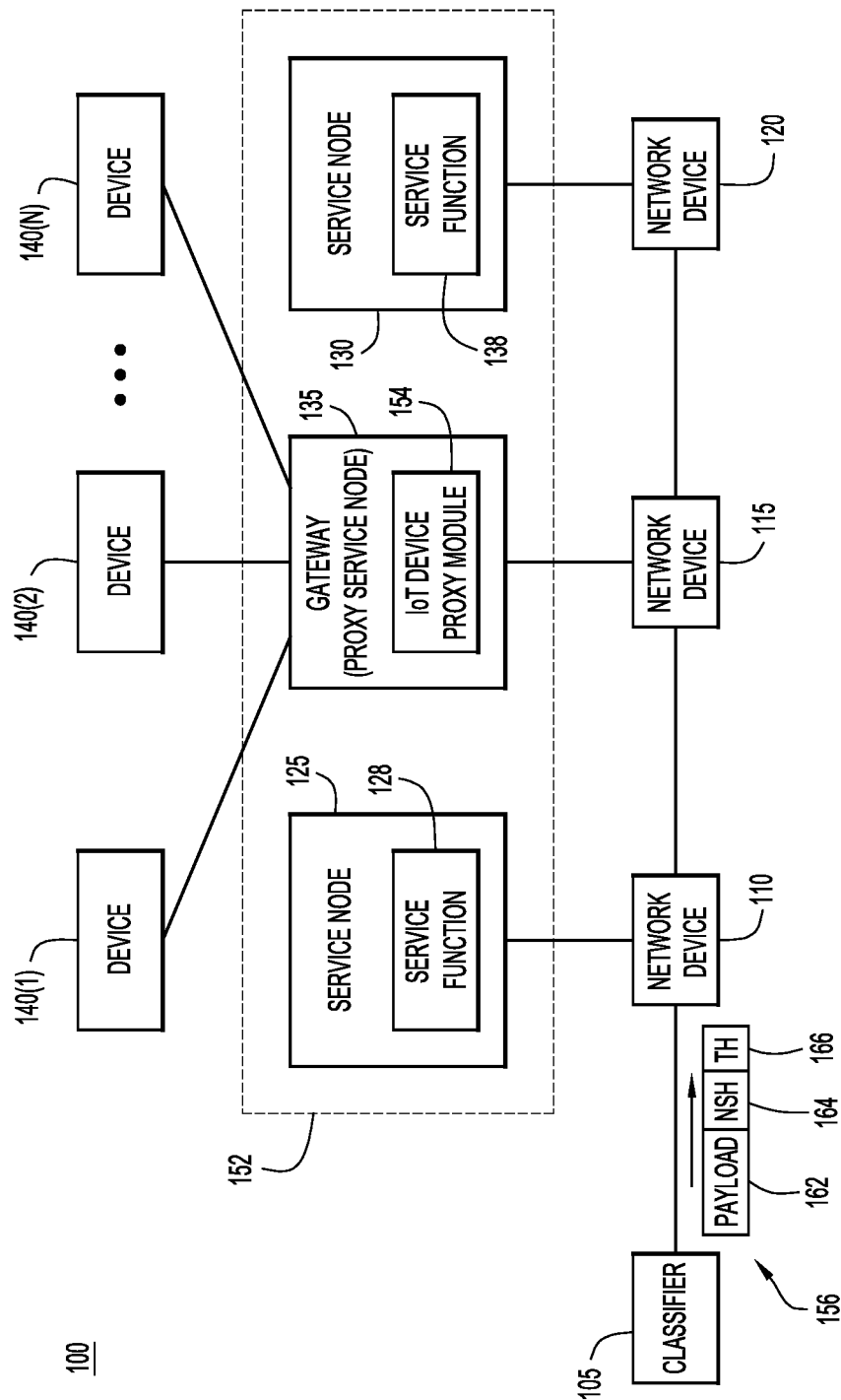
FIG. 1 is a block diagram illustrating a network environment in which a special-purpose network device is indirectly integrated in a service function chain, according to an example embodiment.

Accordingly, presented herein are techniques that use proxy devices to indirectly integrate/incorporate IoT devices or other network connected devices into service function chains. For example, FIG. 1 is a block diagram illustrating a network environment 100 in which the techniques presented herein may be implemented. The network environment 100 includes a classifier network node (classifier) 105, network devices 110, 115, and 120, service nodes 125 and 130, and an IoT gateway 135. The network devices 110, 115, and 120 may comprise, for example, switches, routers, etc., that are operable to exchange packets sent between the classifier 105, the service nodes 125 and 130, and/or the IoT gateway 135.

The service nodes 125 and 130 may each host/support one or more service-functions (services) for application to data at the respective service node. FIG. 1 illustrates a service function 128 at service node 125, and a service function 138 at service node 130. The IoT gateway 135 is configured to communicate with a plurality of IoT devices (i.e., special purpose network connected devices) 140(1)-140(N).

As noted above, a service function chain defines a set of service functions and the order in which the service functions should be applied. In the example of FIG. 1, there is a need to include the functionality provided by one or more of the IoT devices 140(1)-140(N) in a service function chain. However, also as noted above, due to the limited processing capabilities of the IoT devices 140(1)-140(N) and/or the number of IoT devices, it may be impractical or difficult to directly include the IoT devices 140(1)-140(N) into the service function chain. As such, in accordance with embodiments presented herein, the IoT gateway 135 is configured to operate as a proxy device so as to allow one or more of the IoT devices 140(1)-140(N) to be indirectly incorporated into a service function chain. In other words, the service function chain is able to include the functionality provided by the one or more of the IoT devices 140(1)-140(N), without requiring the one or more of the IoT devices 140(1)-140(N) to process service function chain packets (i.e., packets sent through the service function chain using service headers).

In the example of FIG. 1, a service function chain 152 is defined to include the IoT gateway 135, which is connected to the one or more of the IoT devices 140(1)-140(N) for which the functionality thereof is to be utilized. As described further below, the IoT gateway 135 operates as a proxy for (on behalf of) the one or more of the IoT devices 140(1)-140(N). The service function chain 152 also includes service nodes 125 and 130.

In operation, the classifier 105 receives, generates, etc. a service chain packet 156 to be forwarded through the service function chain 152 (i.e., for processing, in order, at service node 125, IoT gateway 135, and service node 130). The service chain packet 156 includes payload 162 that is encapsulated in a service header 164 and then encapsulated within a transport header (TH) 166. A service header, such as service header 164, is metadata added to a packet or frame that is used to create a service plane. The payload 162 and the service header 164 are then encapsulated in the outer TH 166 for transport through the service chain. The service header 164 may be added by a service classification function, i.e., the classifier 105 (in the form of a device or application), that determines which packets require servicing, and correspondingly which service path to follow to apply the appropriate service.

For ease of illustration, examples presented herein will be primarily described with reference to one specific type of service header, referred to as the Network Service Header (NSH) 164. It will be appreciated that the examples presented herein may be used with other types of service headers.

The classifier 105 sends the service chain packet 156 through the service function chain 152, where the packet is first processed at service node 125 (i.e., service function 128 is performed) before the packet is sent to IoT gateway 135. As described further below, the NSH 164 includes instruction/information useable by the IoT gateway 135 to request information from one or more of the IoT devices 140(1)-140(N). That is, IoT device control commands are incorporated into the metadata fields of the NSH 164 and these commands can be used by the IoT gateway 135 to communicate with the selected one or more IoT devices 140(1)-140(N) and request the required/demanded data.

When the IoT gateway 135 receives the service chain packet 156, the IoT gateway processes the NSH 164 to obtain the information embedded therein. Using the information obtained from the NSH 164, the IoT gateway 135 operates to gather data from one or more of the IoT devices 140(1)-140(N). The IoT gateway 135 is configured to update the service chain packet 156 to include the data gathered from the one or more of the IoT devices 140(1)-140(N) in the NSH 164. The IoT gateway 135 is then configured to send the updated service chain packet 156 (which includes data gathered from the one or more of the IoT devices 140(1)-140(N)) along the service function chain 152 (e.g., to service node 130). In other words, the IoT gateway 135 provides communication channels for the devices 140(1)-140(N) that enable data to be gathered from the IoT devices 140(1)-140(N) without directly integrating the IoT devices 140(1)-140(N) themselves into the service function chain. In one example latency is minimized by reducing the number of components of the service function chain through the use of the IoT gateway 135 as a proxy for the IoT devices 140(1)-140(N).

In the example of FIG. 1, once the service chain packet 156 is processed at the IoT gateway 135, the service chain packet is sent to, and processed at, service node 130 (i.e., service function 138 is performed). Subsequently, the packet 156 exits the service function chain 152 (e.g. the packet is returned to classifier 105 or forwarded to another device where the NSH 164 is removed).

As shown in FIG. 1, the IoT gateway 135 includes an IoT device proxy module 154. The IoT device proxy module 154 provides the functionality to indirectly integrate one or more of the IoT devices 140(1)-140(N) into the service function chain 152. That is, when the packet 156 is received at the IoT gateway 135, the IoT device proxy module 154 is configured to process and analyze the service header 164 to determine which of the IoT devices 140(1)-140(N) are to provide data. The IoT device proxy module 154 enables the IoT gateway 135 to retrieve the data from the IoT device(s) and, when the data is received, incorporate the data in the service header 164 for forwarding as part of the service chain packet 156 along the service function chain 152.

In one example, the IoT devices 140(1)-140(N) are network connected thermometers and the NSH 164 includes instructions for requesting information relating to the temperature of environment(s) inhabited by one or more of the network thermometers. In a further example, the devices 140(1)-140(N) may be located in a large data center such that the classifier includes instructions for requesting information relating to the temperature of a large data center.

It will be understood by one of ordinary skill in the art that FIG. 1 is provided merely as an example. The devices 140(1)-140(N) may be located outside a large data center (e.g., assembly line, outdoors, etc.). In addition, devices 140(1)-140(N) may provide data that does not pertain to temperature (e.g., humidity, photon frequency/intensity, etc.). Further, devices 140(1)-140(N) may be any special purpose network connected devices (e.g., lights, timers, etc.), and need not be sensors. One of ordinary skill in the art will also appreciate that the IoT gateway 135 may be located at any node of the service function chain (e.g., may be the service function closest to or furthest from the classifier 105). There may be any number of network functions in the service function chain, any number of IoT gateways in the service function chain, and any number of IoT devices in communication with the IoT gateways in the service function chain.

Figure 2:
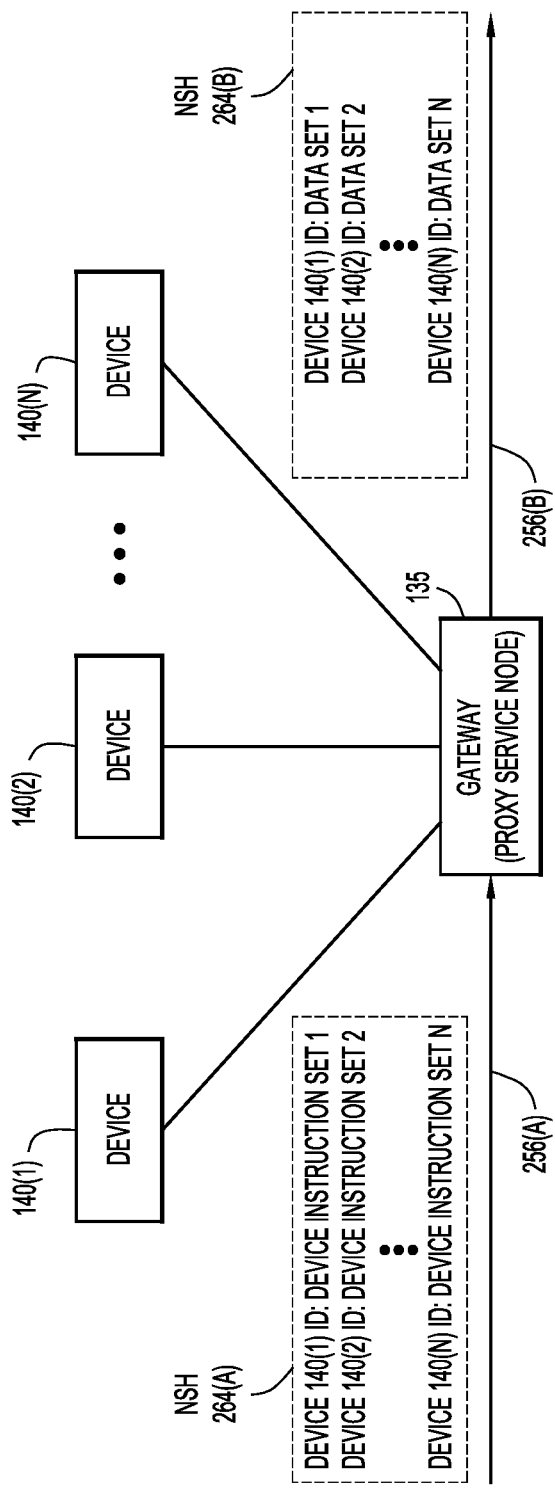
FIG. 2 is a block diagram illustrating a portion of the service function chain of FIG. 1, according to an example embodiment.

FIG. 2 is a diagram further illustrating the operations of the IoT gateway 135 in accordance with certain examples presented herein. In particular, in the example of FIG. 2, the IoT gateway 135 receives a service chain packet, which is generally represented in FIG. 2 by arrow 256(A). The service chain packet 256(A) includes an NSH 264(A) in which instructions to request data from one or more of the IoT devices 140(1)-140(N) are embedded within metadata of the NSH 264(A). For example, the NSH 264(A) may include device instruction sets corresponding to each of devices 140(1)-140(N), which is identified by a device identification (ID). In another example, the NSH 264(A) may include instructions for requesting information for a subset of the devices 140(1)-140(N) (e.g., only device 140(1)). As such, the NSH may include an identification of the one or more special purpose network connected devices from which the data is to be obtained and at least one instruction set for obtaining the data from the one or more special purpose network connected devices.

After receiving the service chain packet 256(A), the IoT gateway 135 obtains the data from the one or more of the IoT devices 140(1)-140(N). That is, based on the information in the NSH 264(A), the IoT gateway 135 sends requests for data to the respective IoT devices 140(1)-140(N) (i.e., the IoT gateway 135 follows the device instruction sets included in the NSH). The IoT devices 140(1)-140(N) that receive the requests for data respond to the respective requests by sending, to the IoT gateway 135, data gathered by the respective IoT device.

Once the data is received from the one or more IoT devices 140(1)-140(N), the IoT gateway 135 is configured to forward the data along the service function chain in a modified version of the service chain packet. More specifically, the IoT gateway 135 recompiles the NSH metadata to generate a modified NSH 264(B). In general, the modified NSH 264(B) includes data sets reported by IoT devices 140(1)-140(N). In one example, a first data set (data set 1) corresponds to data gathered/reported by IoT device 140(1), a second data set (data set 2) corresponds to data gathered/reported by IoT device 140(2), and so on. Similar to NSH 264(A), NSH 264(B) may identify each of the one or more IoT devices 140(1)-140(N) by an IoT device ID. As such, the NSH 264(B) may include an identification of the one or more IoT devices from which the data was gathered. The IoT gateway 135 transmits the modified service chain packet, which is generally represented in FIG. 2 by arrow 256(B), along the corresponding service function chain.

Figure 3:
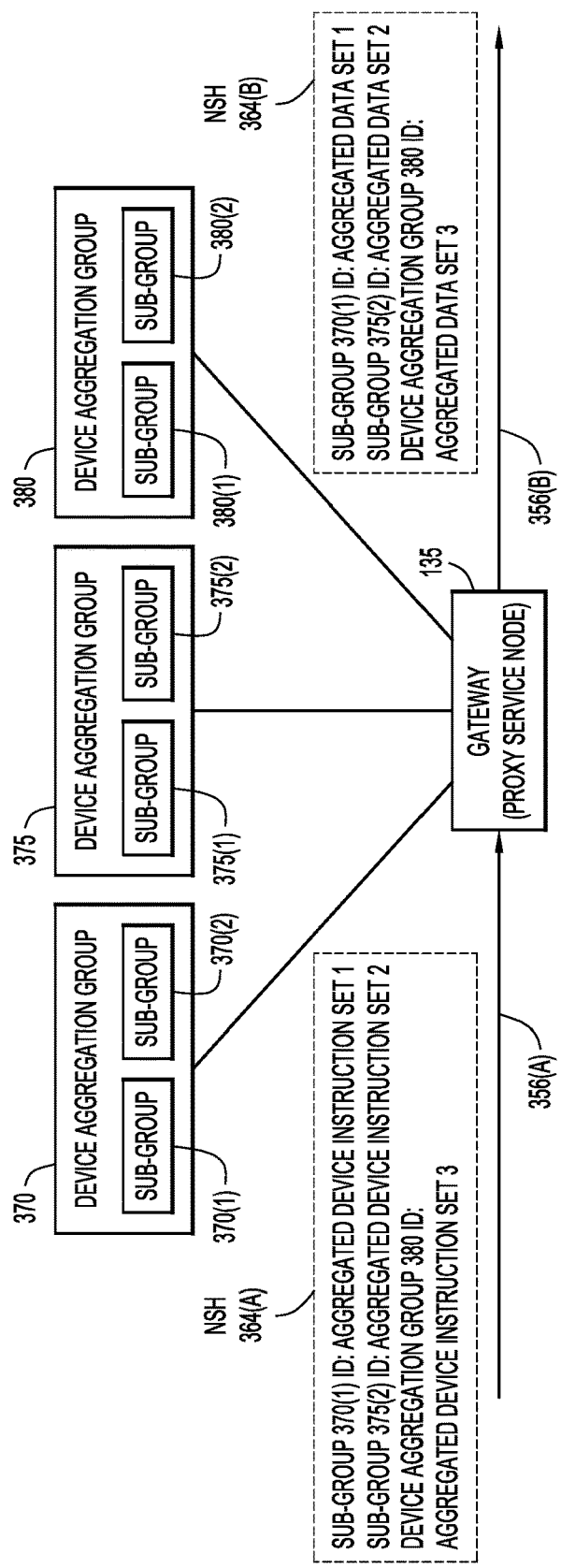
FIG. 3 is another block diagram illustrating a portion of the service function chain of FIG. 1, according to another example embodiment.

FIG. 2 illustrates an example in which the IoT gateway 135 operates to indirectly integrate individual IoT devices into a service function chain (i.e., the IoT gateway 135 receives instructions to obtain data from a particular one or more of the IoT devices 140(1)-140(N)). FIG. 3 is a diagram illustrating an example in which the IoT gateway 135 operates to indirectly integrate an aggregation (aggregated group) of a plurality of IoT devices 140(1)-140(N) into a service function chain.

In particular, in the example of FIG. 3, the IoT gateway 135 is operable to communicate with (e.g., request/receive data from) IoT devices within one or more logically arranged device aggregation groups 370, 375, and 380. In the example of FIG. 3, each of the aggregation groups 370, 375, and 380 include first and second sub-groups (i.e., aggregation group 370 includes sub-groups 370(1) and 370(2), aggregation group 375 includes sub-groups 375(1) and 375(2), and aggregation group 380 includes sub-groups 380(1) and 380(2)).

Device aggregation groups 370, 375, and 380 are logical arrangements of one or more IoT devices (e.g., devices 140(1)-140(N)). In an example, device aggregation group 370 includes "connected city" devices (e.g., devices integrated into city infrastructure). In this example, sub-group 370(1) includes "connected roadway" devices (e.g., devices specifically integrated into roadway infrastructure), and sub-group 370(2) includes "connected light" devices (devices integrated into light infrastructure). Device aggregation group 375 may include "utility grid" devices (e.g., devices integrated into one or more utility grids). For example, sub-group 375(1) may include "smart meter" devices (e.g., devices integrated into utility meters), while sub-group 375(2) may include "asset tracking" devices (e.g., devices for tracking assets). Device aggregation group 380 includes "manufacturing floor" devices (e.g., devices integrated into manufacturing floors). In this example, sub-group 380(1) includes "assembly line" devices (e.g., devices integrated into assembly lines), while sub-group 380(2) includes "floor safety" devices (e.g., safety devices integrated into manufacturing floors). Other logical arrangements (e.g., sub-groups or even lower level groups) may also be provided.

In the example of FIG. 3, the IoT gateway 135 receives a service chain packet, which is generally represented in FIG. 3 by arrow 356(A). The service chain packet 356(A) includes an NSH 364(A) in which instructions to request aggregated data from one or more of the groups or sub-groups of the IoT devices are embedded in metadata of the NSH. For example, FIG. 3 illustrates that NSH 364(A) comprises instructions for requesting information from IoT devices in sub-groups 370(1) and 375(2), and from device aggregation group 380. As such, NSH 364(A) includes device instruction sets corresponding to each of the sub-groups 370(1) and 375(2), and from device aggregation group 380, which are identified by their respective IDs.

After receiving the service chain packet 356(A), the IoT gateway 135 obtains the data from the sub-groups 370(1) and 375(2), and from device aggregation group 380. That is, based on the information in the NSH 364(A), the IoT gateway 135 sends requests for data to the respective IoT device sub-groups 370(1) and 375(2), and from device aggregation group 380. The IoT devices that receive the requests for data respond to the respective requests by sending, to the IoT gateway 135, data gathered by the respective IoT device. In certain examples, the requested data may be data aggregated by one or more of the devices in the respective group or sub-group.

Once the data is received from the sub-groups 370(1) and 375(2) and from device aggregation group 380, the IoT gateway 135 is configured to forward the data along the service function chain in a modified version of the service chain packet. More specifically, the IoT gateway 135 recompiles the NSH metadata to generate a modified NSH 364(B). In general, the modified NSH 364(B) includes aggregated data sets reported by sub-groups 370(1) and 375(2) and device aggregation group 380. In one example, aggregated data set 1 corresponds to data gathered/reported by IoT devices in sub-group 370(1), aggregated data set 2 corresponds to data gathered/reported by IoT devices in sub-group 375(2), and aggregated data set 3 corresponds to data gathered/reported by IoT devices in device aggregation group 380. Data may be aggregated based on the aggregated device instruction sets in a number of ways (e.g., by averaging data, providing maximum and minimum values, etc.). Individual (i.e., non-aggregated) data from individual IoT devices within a device aggregation may also/alternatively be provided. Similar to NSH 364(A), NSH 364(B) identifies sub-groups 370(1) and 375(2) and device aggregation group 380 by their respective IDs. Thus, these identifications may indicate that the data is aggregated from a subset of IoT devices. The IoT gateway 135 transmits the modified service chain packet, which is generally represented in FIG. 3 by arrow 356(B), along the corresponding service function chain.

Aggregating devices in the manner described in FIG. 3 may enable an IoT gateway in a service function chain to efficiently reach large numbers (e.g., hundreds, thousands, etc.) of IoT devices, thereby avoiding the inconvenience/inefficiencies associated with incorporating these IoT devices directly into the service function chain. Logically arranging devices (e.g., by device function) permits the IoT to serve as a proxy in the service function chain for a multitude of IoT devices by injecting only relevant data from the IoT devices (e.g., only temperature data) into the service function chain. The aggregation scheme may be defined north-bound of the IoT gateway such that client devices do not require knowledge of individual device IDs. By logically aggregating IoT devices, a client device may request data from a multitude of IoT devices without storing or providing individual device IDs. Logically aggregating devices also reduces required space in the NSH, thereby reducing packet overhead.

As described above, in accordance with examples presented herein, the requests for data from IoT devices are embedded in the NSH metadata. While IoT device commands (e.g., to transmit data gathered at the IoT device) in the body of a packet are typically unavailable to an IoT gateway, commands located in a NSH are not. In other words, when commands are located in the body of the packet, they may be "hidden" from the IoT gateway (i.e., the IoT gateway is not aware of the commands), and/or the IoT gateway lacks the required dedicated protocols to implement these commands. However, when these commands are stored in the NSH, IoT gateways in accordance with embodiments presented herein (i.e., gateways with an IoT device proxy module) may use the commands within an NSH to gather data from the IoT devices in order to, for example, influence policy enforcement. This can improve the performance of, for example, traffic destined for IoT devices to gather real-time data. For certain commands (e.g., maintenance commands), a best effort approach may be used to deliver such traffic.

Additionally, by transmitting the commands in the NSH, no additional protocols are required to transmit information between the IoT gateway and the IoT devices. The IoT gateway is able to understand the commands in the NSH and extract these commands based on the device (or aggregate) IDs. For example, the IoT gateway may translate these commands into the appropriate language to comply with any standards of the relevant dedicated protocols. Similarly, the IoT gateway complies with the relevant standards when receiving the data from the IoT devices in response to the commands.

In accordance with certain examples, the data gathered by an IoT gateway may influence the way in which network functions enforce certain policies by causing network functions to change their policies accordingly. For example, a first IoT device may be located in a first location in the large data center, a second IoT device may be located in a second location in the large data center, and third IoT device may be located in a third location in the large data center. If the first IoT device reports high (e.g., above a threshold) temperatures and the second and third IoT devices report normal (e.g., below a threshold) temperatures, network elements in the first location may be circumvented to avoid potential harm (e.g., by overheating).

Figure 4B:
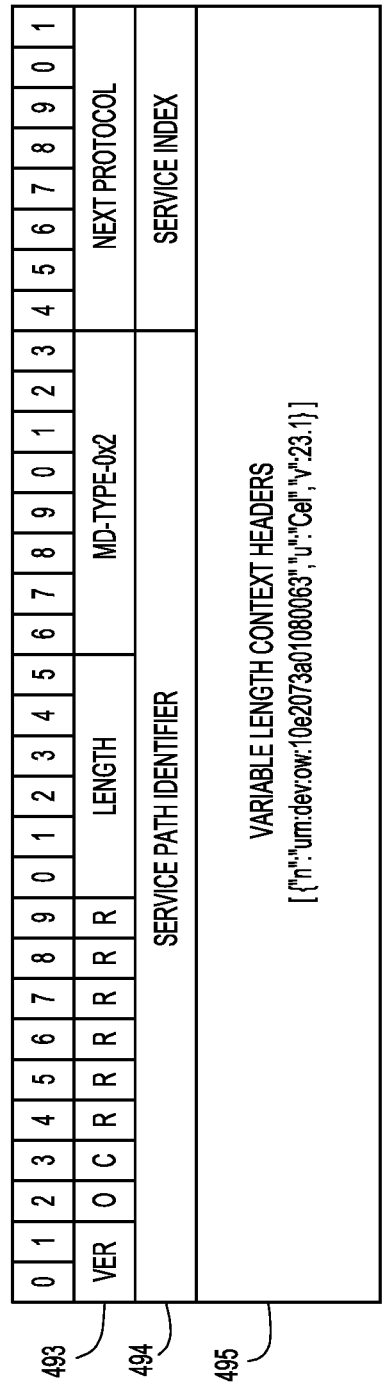
FIG. 4B is a diagram illustrating another service header that may be used for indirect integration of a special-purpose network device into a service function chain, according to another example embodiment.

FIGS. 4A and 4B illustrate sample NSHs 464(1) and 464(2), respectively, that may be used for indirect integration of an IoT device (special-purpose network connected device) into a service function chain in accordance with the examples provided herein. FIG. 4A illustrates a fixed-length type-1 NSH 464(1), while FIG. 4B illustrates a variable-length type-2 NSH 464(2). Both of these types of NSHs enable configurable/optional values (e.g., instructions for requesting data, the requested data, etc.) to be transmitted over a service function chain for use by one or more network functions in the service function chain (e.g., an IoT gateway). In certain examples, the use of a Type-2 NSH may be advantageous due to metadata size requirements.

Turning first to FIG. 4A, a type-1 NSH 464(1) includes a protocol header 482, a service path header 484, and fixed-length context headers 486, 488, 490, 492. The protocol header 482 and service path header 484 may be predefined. The fixed-length context headers 486, 488, 490, 492 may carry instructions for requesting data from one or more individual or aggregated IoT devices. The fixed-length context headers 486, 488, 490, 492 may be dynamically modified by the gateway 135 to include data reported by the individual or aggregated IoT devices. Thus, NSH 464(1) may include commands, responses, and/or other relevant IoT device data.

The fixed-length context headers 486, 488, 490, 492 include information (e.g., instructions for requesting data, the requested data, etc.) written in Sensor Markup Language (SenML). SenML allows, for example, data gathered by IoT devices to be carried in a variety of protocols (e.g., Hypertext Transfer Protocol, Constrained Application Protocol, etc.). In the example of FIG. 4A, NSH 464(1) includes data, specifically a temperature reading from a one-wire sensor, that is provided in SenML. The syntax of SenML includes name, time, value, sum, and version attributes. In the NSH 464(1), "n" corresponds to the name, "urn:dev:ow: 10e2073a01080063" corresponds to the time, "u" corresponds to the unit, "Cel" corresponds to the value, "v" corresponds to the sum, and "23.1" corresponds to the version. Thus, SenML may be used in a NSH to define instructions for requesting data from IoT devices as well as the requested data. That is, an IoT gateway may utilize NSH 464(1)/SenML to indirectly incorporate IoT devices into a service function chain.

Turning now to FIG. 4B, shown is a type-2 NSH 464(2), which may also enable an IoT gateway to indirectly incorporate IoT devices into a service function chain. The NSH 464(2) includes a protocol header 493, a service path header 494, and variable-length context headers 495. The protocol header 493 and service path header 494 may be predefined. The variable-length context headers 495 may carry instructions for requesting data from one or more individual or aggregated devices. The variable-length context headers 495 may be dynamically modified by the gateway 135 to include data reported by the individual or aggregated devices. Thus, like NSH 464(1), NSH 464(2) may include commands, responses, and/or other relevant device data.

The variable-length context headers 495 include information (e.g., instructions for requesting data, the requested data, etc.) written in SenML. NSH 464(2) includes, as an example, the same data provided in NSH 464(1) in SenML. It will be appreciated by one of ordinary skill on the art that SenML is merely an example, and any language/format configured for commands/requests for data may be used. Using a standardized language/format (e.g., SenML) in the metadata of an NSH eliminates the need for end user devices to use protocols for communicating with the special purpose network connected devices. This also eliminates the burden of encapsulating and decapsulating packets from the end user device to the IoT gateway, thereby increasing network latency and acceptance rates.

FIG. 5 is a flowchart of a method 550 in accordance with the examples presented herein. The method 550 is executed at a gateway device (e.g., IoT gateway) that is configured to operate as (defined as) a network function in a service function chain and is connected to a plurality of special purpose network connected devices. The gateway device is also configured to operate as a proxy device to indirectly integrate the one or more special purpose network connected devices into the service function chain. Method 550 begins at 551 where the gateway device receives a service function chain packet that includes a request to obtain data from one or more of the plurality of special purpose network connected devices. At 553, the gateway device obtains the data from the one or more special purpose network connected devices and, at 555, the gateway device modifies the service function chain packet to include the data obtained from the one or more special purpose network connected devices. At 557, the gateway device sends the service function chain packet that has been modified to include the data obtained from the one or more special purpose network connected devices along the service function chain.

Figure 6:
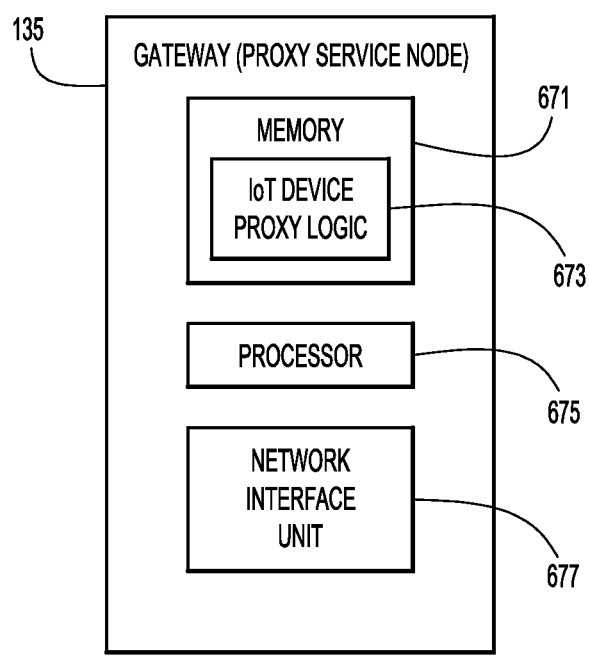
FIG. 6 is a block diagram of an Internet of Things (IoT) gateway, according to an example embodiment.

FIG. 6 is a block diagram of an IoT gateway, such as IoT gateway 135 shown in FIGS. 1-3, that is configured to implement the techniques presented herein. In this example, the IoT gateway 135 includes a memory 671, which includes IoT device proxy logic 673, one or more processors 675, and a network interface unit 677. The one or more processors 675 are configured to execute instructions stored in the memory 671 (e.g., IoT device proxy logic 673). When executed by the one or more processors 675, the IoT device proxy logic 673 enables the IoT gateway 135 to perform the operations associated with IoT device proxy module 154 (FIG. 1). The memory 671 may be read only memory (ROM), random access memory (RAM), magnetic disk storage media devices, optical storage media devices, flash memory devices, electrical, optical, or other physical/tangible memory storage devices. Thus, in general, the memory 671 may comprise one or more tangible (non-transitory) computer readable storage media (e.g., a memory device) encoded with software comprising computer executable instructions and when the software is executed (by the processor 675) it is operable to perform the operations described herein.

Using/defining an IoT gateway as a network function in a service function chain provides a proxy between IoT devices and other network functions in the service function chain, thereby minimizing network latency. By indirectly incorporating IoT devices into a service function chain, other network functions may leverage the data provided by the IoT devices for policy enforcement. In addition, multi-destination protocols (e.g., multicast) are unnecessary because the device (or aggregate) IDs are included in the NSH. In addition, when the IoT device instructions are incorporated into the NSH, other components of the service function chain (e.g., other network functions, such as firewalls, load balancers, network address translation, etc.) may not require any awareness of the protocols used to facilitate communication between the IoT gateway and IoT devices, thereby enabling protocol-independent communication between the other components in the service function chain and the IoT devices via the IoT gateway. In an example, the IoT gateway allows for dynamic communication with IoT via the NSH. By leveraging north- and south-bound Application Program Interfaces (APIs) and functionalities, an IoT gateway may be integrated in a service function chain to enable communication channels to IoT devices.

In one form, a method is provided. The method comprises: at a gateway device that is configured to operate as a network function in a service function chain and is connected to a plurality of network connected devices: receiving a service function chain packet that includes a request to obtain data from one or more of the plurality of network connected devices, wherein the gateway device is configured to operate as a proxy device to indirectly integrate the one or more network connected devices into the service function chain; obtaining the data from the one or more network connected devices; modifying the service function chain packet to include the data obtained from the one or more network connected devices; and sending the service function chain packet that has been modified to include that data obtained from the one or more network connected devices along the service function chain.

In another form, an apparatus is provided. The apparatus comprises: a network interface unit configured to communicate with a plurality of network connected devices; a memory; and one or more processors coupled to the memory and configured to: receive a service function chain packet that includes a request to obtain data from one or more of the plurality of network connected devices, wherein the apparatus is configured to operate as a proxy device to indirectly integrate the one or more network connected devices into the service function chain; obtain the data from the one or more network connected devices; modify the service function chain packet to include the data obtained from the one or more network connected devices; and send the service function chain packet that has been modified to include that data obtained from the one or more network connected devices along a service function chain.

In another form, one or more non-transitory computer readable storage media at a gateway device that is configured to operate as a network function in a service function chain and is connected to a plurality of network connected devices are provided. The computer readable storage media is encoded with instructions that, when executed by a processor, cause the processor to: receive a service function chain packet that includes a request to obtain data from one or more of the plurality of network connected devices, wherein the gateway device is configured to operate as a proxy device to indirectly integrate the one or more network connected devices into the service function chain; obtain the data from the one or more network connected devices; modify the service function chain packet to include the data obtained from the one or more network connected devices; and send the service function chain packet that has been modified to include that data obtained from the one or more network connected devices along the service function chain.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a gateway device that is configured to operate as a network function in a service function chain and is connected to a plurality of network connected devices:
      receiving a service function chain packet that is encapsulated into a service header, wherein the service header includes a request to obtain data from one or more of the plurality of network connected devices, wherein the gateway device is configured to operate as a proxy device to indirectly integrate the one or more of the plurality of network connected devices into the service function chain;
      obtaining the data from the one or more of the plurality of network connected devices;
      modifying the service function chain packet to include the data obtained from the one or more of the plurality of network connected devices; and
      sending the service function chain packet that has been modified to include the data obtained from the one or more of the plurality of network connected devices along the service function chain.

2. The method of claim 1, wherein modifying the service function chain packet to include the data obtained from the one or more of the plurality of network connected devices comprises:
   incorporating the data obtained from the one or more of the plurality of network connected devices into the service header of the service function chain packet.

3. The method of claim 2, wherein incorporating the data obtained from the one or more of the plurality of network connected devices into the service header of the service function chain packet comprises:
   incorporating, into the service header, an identification of the one or more of the plurality of network connected devices from which the data was obtained.

4. The method of claim 3, wherein the identification indicates that the data is aggregated from a subset of the plurality of network connected devices.

5. The method of claim 1, wherein the service header includes:
   an identification of the one or more of the plurality of network connected devices from which the data is to be obtained; and
   at least one instruction set for obtaining the data from the one or more of the plurality of network connected devices.

6. The method of claim 5, wherein the at least one instruction set includes instructions for aggregating data from a subset of the plurality of network connected devices.

7. The method of claim 1, wherein the service header is a type-1 service header.

8. The method of claim 1, wherein the service header is a type-2 service header.

9. An apparatus comprising:
   a network interface unit configured to communicate with a plurality of network connected devices;
   a memory; and
   one or more processors coupled to the memory and configured to:
      receive a service function chain packet that is encapsulated into a service header, wherein the service header includes a request to obtain data from one or more of the plurality of network connected devices, wherein the apparatus is configured to operate as a proxy device to indirectly integrate the one or more of the plurality of network connected devices into a service function chain;
      obtain the data from the one or more of the plurality of network connected devices;
      modify the service function chain packet to include the data obtained from the one or more of the plurality of network connected devices; and
      send the service function chain packet that has been modified to include the data obtained from the one or more of the plurality of network connected devices along a service function chain.

10. The apparatus of claim 9, wherein to modify the service function chain packet to include the data obtained from the one or more of the plurality of network connected devices, the one or more processors are configured to:
   incorporate the data obtained from the one or more of the plurality of network connected devices into the service header of the service function chain packet.

11. The apparatus of claim 10, wherein to incorporate the data obtained from the one or more of the plurality of network connected devices into the service header of the service function chain packet, the one or more processors are configured to:
   incorporate into the service header an identification of the one or more of the plurality of network connected devices from which the data was obtained.

12. The apparatus of claim 11, wherein the identification indicates that the data is aggregated from a subset of the plurality of network connected devices.

13. The apparatus of claim 9, wherein the service header includes:
   an identification of the one or more of the plurality of network connected devices from which the data is to be obtained; and
   at least one instruction set for obtaining the data from the one or more of the plurality of network connected devices.

14. The apparatus of claim 13, wherein the at least one instruction set includes instructions for aggregating data from a subset of the plurality of network connected devices.

15. One or more non-transitory computer readable storage media at a gateway device that is configured to operate as a network function in a service function chain and is connected to a plurality of network connected devices, wherein the computer readable storage media is encoded with instructions that, when executed by a processor, cause the processor to:
   receive a service function chain packet that is encapsulated into a service header, wherein the service header includes a request to obtain data from one or more of the plurality of network connected devices, wherein the gateway device is configured to operate as a proxy device to indirectly integrate the one or more of the plurality of network connected devices into the service function chain;
   obtain the data from the one or more of the plurality of network connected devices;
   modify the service function chain packet to include the data obtained from the one or more of the plurality of network connected devices; and
   send the service function chain packet that has been modified to include the data obtained from the one or more of the plurality of network connected devices along the service function chain.

16. The non-transitory computer readable storage of claim 15, wherein the instructions operable to modify the service function chain packet to include the data obtained from the one or more of the plurality of network connected devices comprise instructions operable to:
   incorporate the data obtained from the one or more of the plurality of network connected devices into the service header of the service function chain packet.

17. The non-transitory computer readable storage of claim 16, wherein the instructions operable to incorporate the data obtained from the one or more of the plurality of network connected devices into the service header of the service function chain packet comprise instructions operable to:
   incorporate, into the service header, an identification of the one or more of the plurality of network connected devices from which the data was obtained.

18. The non-transitory computer readable storage of claim 17, wherein the identification indicates that the data is aggregated from a subset of the plurality of network connected devices.

19. The non-transitory computer readable storage media of claim 15, wherein the service header includes:
   an identification of the one or more of the plurality of network connected devices from which the data is to be obtained; and
   at least one instruction set for obtaining the data from the one or more of the plurality of network connected devices.

20. The non-transitory computer readable storage of claim 19, wherein the at least one instruction set includes instructions for aggregating data from a subset of the plurality of network connected devices.

* * * * *